United States Patent
Kioua et al.

(10) Patent No.: US 10,087,781 B2
(45) Date of Patent: Oct. 2, 2018

(54) ASSEMBLY CENTERING DEVICE FOR TURBOJET ENGINE NACELLE

(71) Applicant: AIRCELLE, Gonfreville l'Orcher (FR)

(72) Inventors: Hazem Kioua, Saint Jouin Bruneval (FR); Xavier Raymond Yves Lore, Beuzeville le Grenier (FR); Olivier Conet, Gruchet le Valane (FR); Xavier Holay, le Havre (FR)

(73) Assignee: AIRCELLE, Gonfreville l'Orcher (FR)

( * ) Notice: Subject to any disclaimer, the term of this patent is extended or adjusted under 35 U.S.C. 154(b) by 584 days.

(21) Appl. No.: 14/730,687

(22) Filed: Jun. 4, 2015

(65) Prior Publication Data
US 2015/0267560 A1    Sep. 24, 2015

Related U.S. Application Data

(63) Continuation of application No. PCT/FR2013/052870, filed on Nov. 27, 2013.

(30) Foreign Application Priority Data

Dec. 12, 2012   (FR) ..................... 12 61955

(51) Int. Cl.
*F01D 25/24*    (2006.01)
*B64D 29/06*    (2006.01)

(52) U.S. Cl.
CPC .............. *F01D 25/24* (2013.01); *B64D 29/06* (2013.01); *F05D 2240/14* (2013.01); *Y02T 50/671* (2013.01)

(58) Field of Classification Search
CPC ......... F01D 25/24; B64D 29/06; B64D 29/08; B64D 27/26; B64D 33/02; F05D 2240/14;
(Continued)

(56) References Cited

U.S. PATENT DOCUMENTS 2,466,602 A     4/1949  Lombard et al.
5,251,917 A *  10/1993  Chee ..................... B64D 27/00
                                                              244/129.1

(Continued)

FOREIGN PATENT DOCUMENTS

EP         0 898 063 A1     2/1999

OTHER PUBLICATIONS

International Search Report dated Apr. 23, 2014 in International Application No. PCT/FR2013/052870.

*Primary Examiner* — Phutthiwat Wongwian
*Assistant Examiner* — Loren Edwards
(74) *Attorney, Agent, or Firm* — Burris Law, PLLC

(57) ABSTRACT

The present disclosure relates to a centering device for a nacelle of a turbojet engine providing the flush centering of an outer downstream panel of a thrust reverser with respect to a cowl of a fan casing. The centering device includes, in one single piece: a sub plate allowing the fixing of the centering device to the fan casing; a first positioning arm integrally formed with the sub plate, protruding upstream, in such a manner as to form, with respect to a directing axis (A) of the nacelle; a first radial abutment designed for guiding the cowl of the fan casing; and a second positioning arm, integrally formed with the sub plate, protruding downstream, in such a manner as to form, with respect to the directing axis (A) of the nacelle, a second radial abutment designed for guiding the outer downstream panel.

13 Claims, 1 Drawing Sheet

Fig. 5

(58) Field of Classification Search
CPC . Y02T 50/671; F02K 1/70; F02K 1/72; F02C 7/04; F02C 7/20
USPC .......................................................... 60/262
See application file for complete search history.

(56) References Cited

U.S. PATENT DOCUMENTS

| | | |
|---|---|---|
| 2003/0163985 A1 | 9/2003 | Stretton et al. |
| 2006/0145001 A1* | 7/2006 | Smith .................... B64D 29/06 244/110 B |
| 2010/0193632 A1* | 8/2010 | Welch ...................... F02K 1/08 244/110 B |

* cited by examiner

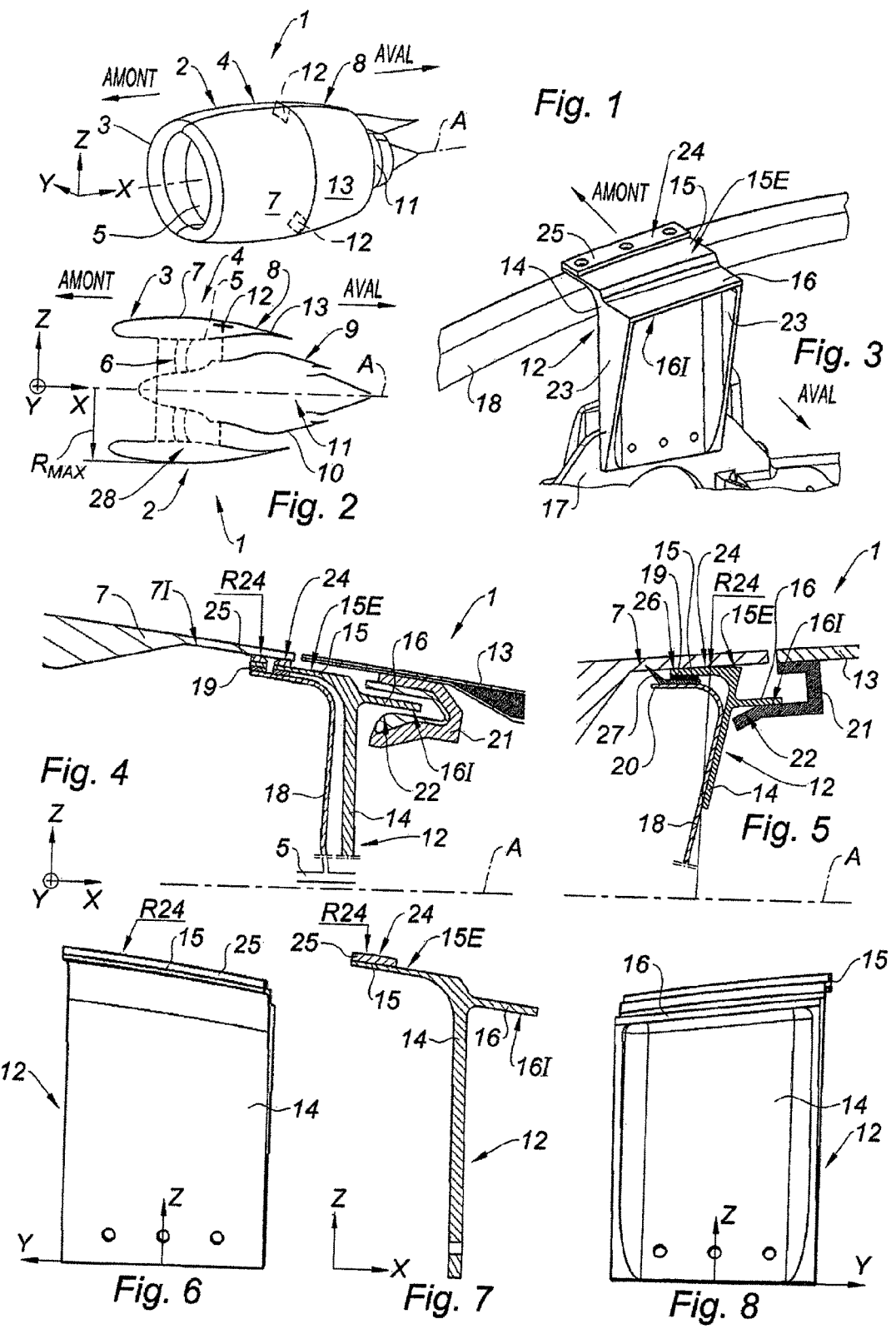

US 10,087,781 B2

ASSEMBLY CENTERING DEVICE FOR TURBOJET ENGINE NACELLE

CROSS-REFERENCE TO RELATED APPLICATIONS

This application is a continuation of International Application No. PCT/FR2013/052870, filed on Nov. 27, 2013, which claims the benefit of FR 12/61955, filed on Dec. 12, 2012. The disclosures of the above applications are incorporated herein by reference.

FIELD

The present disclosure relates to the field of aeronautical nacelles intended to body aircraft reactors, and more particularly by-pass turbojet engines.

BACKGROUND

The statements in this section merely provide background information related to the present disclosure and may not constitute prior art.

A nacelle is known to act as a fairing for a turbojet engine, a nacelle which for this purpose generally includes an upstream portion forming a nose surrounding the air inlet, followed by an intermediate portion forming a cowl protecting the fan casing, then a downstream portion able to encompass thrust reversal means.

However, during integration of the nacelle, the adding up of manufacturing and assembling tolerances may sometimes make radial recesses appear between the cowl of the fan casing and the panel or panels of the downstream portion, and more particularly the outer panels of the thrust reversers.

Such recesses may cause losses in aerodynamic performance of the nacelle, but also expose the upstream edges of the panels of thrust reversers to an erosion or delamination phenomenon.

Furthermore, the steps thus marked in the profile of the nacelle tend to deface the outward appearance of the latter.

SUMMARY

The present disclosure provides a new nacelle arrangement which allows adjusting in a simple, reproducible manner and at lower cost, the downstream panels, and more particularly the outer panels of the thrust reversers, in such a manner as to be flush with the cowl of the fan casing.

The present disclosure includes a centering device, which integrates a turbojet engine nacelle that has at least a cowl of a fan casing and at least an outer downstream panel, of the thrust reverser outer panel type, which is placed longitudinally in succession, said centering device being characterized in that it comprises, in one single piece:

a sub plate allowing fixing the centering device to the fan casing;

a first positioning arm, integrally formed with the sub plate, protruding upstream, in such a manner as to form, with respect to the directing axis of the nacelle, a first radial abutment designed for guiding the cowl of the fan casing; and a second positioning arm, integrally formed with the sub plate, protruding downstream, in such a manner as to form, with respect to the directing axis of the nacelle, a second radial abutment designed for guiding the outer downstream panel, in order to be able to provide the positioning of said outer downstream panel substantially in the extension flush with the cowl of the fan casing.

The present disclosure also provides a nacelle for turbojet engine which includes at least such a centering device, and in one form a plurality of such centering devices distributed around the directing axis thereof.

Advantageously, the use of a monolithic centering device allows disposing a set of radial centering abutments fastened to a same sub plate, that is to say, to a same joint trunk of which said radial abutments form the ramifications, thus considerably reducing the chain of dimensions, in particular radial, between the first abutment supporting the cowl of the fan casing and the second abutment supporting the outer panel of the thrust reverser.

In other words, the use of a centering device in accordance with the present disclosure amounts to creating a spacer of joint reference, and more particularly radial, between the first abutment and the second abutment, and as a result between the cowl of the fan casing and the panel or panels of the thrust reverser, in such a manner that these different members may be easily centered with respect to each other, at well mastered radial distances from each other.

Hence, a good assembly precision of the downstream panel may be obtained with respect to the cowl of the fan casing, and thus without necessarily having to respect the particularly strict manufacturing or assembling tolerances, which would otherwise require special attention or complex equipment.

The manufacturing and assembling operations of the nacelle in accordance with the present disclosure are therefore relatively fast, precise, reproducible and inexpensive.

Further areas of applicability will become apparent from the description provided herein. It should be understood that the description and specific examples are intended for purposes of illustration only and are not intended to limit the scope of the present disclosure.

DRAWINGS

Other objects, features and advantages of the present disclosure will become more apparent upon reading the following description, as well as with the accompanying drawings, provided by way of non-limiting and purely illustrating examples, among which:

FIGS. 1 and 2 illustrate, respectively according to perspective three-quarter front and longitudinal sectional views, the principle of implantation of the centering devices in accordance with the present disclosure within a by-pass turbojet engine nacelle;

FIG. 3 illustrates, according to a perspective partial view, the detail of the implantation of a centering device in accordance with the present disclosure on a holding member linked to the fan casing;

FIG. 4 illustrates, according to a partial longitudinal sectional view, the detail of implantation of the centering device of FIG. 4 within a nacelle in accordance with the present disclosure;

FIG. 5 illustrates, according to a partial longitudinal sectional view, the detail of implantation of another variant of centering device within a nacelle in accordance with the present disclosure;

FIG. 6 illustrates, according to front view (from the upstream), the centering device variant implemented on FIGS. 3 and 4;

FIG. 7 illustrates, according to longitudinal section side view, the centering device variant implemented on FIGS. 3 and 4; and FIG. 8 illustrates, according to rear view (from the downstream), the centering device variant implemented on FIGS. 3 and 4.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure relates to a nacelle 1 intended to act as a fairing for a reactor, of turbojet engine type, and more particularly a by-pass reactor.

In a manner known per se, and such as is in particular visible on FIGS. 1 and 2, the nacelle 1 has an outer structure 2 which includes an upstream portion 3 forming an air inlet, an intermediate portion 4 the inner skin 5 of which is formed by the fan casing 6 of the turbojet engine and the outer skin of which is formed by the cowl 7 of the fan casing (usually called "fan cowl"), then a downstream portion 8 which may incorporate thrust reversal means.

The nacelle 1 also includes an inner structure 9 which comprises a fairing 10 of the engine 11 of the turbojet engine.

As a rule, a reference with three axes X, Y, Z, will be associated to the figures, these axes being representative respectively of the longitudinal, transversal, and vertical directions of the nacelle, when the latter is set up on an aircraft.

In this instance, the longitudinal axis X is parallel, and in one form coincident, with the directing axis A of the nacelle 1, which itself substantially coincides with the axis of rotation of the reactor, and more particularly of the fan 6.

For ease of reference, it will be considered, as a first approximation that the nacelle 1 substantially has a cylindrical shape of revolution around said directing axis A. It may be noted RMAX the overall maximum radius of said shape of revolution.

It will be furthermore considered that the upstream-downstream direction corresponds to the direction of propulsive flow of the reactor, oriented substantially along the longitudinal direction of the nacelle 1 corresponding to the directing axis A, from the leading edge of the nacelle 1 towards the trailing edge thereof.

The present disclosure more particularly relates to a centering device 12 intended to integrate a nacelle 1 of a turbojet engine, such as described above, a nacelle 1 which has at least one cowl of fan casing 7 and at least one outer downstream panel 13, of the outer panel type of thrust reverser, said cowl 7 and said outer panel 13 must be placed longitudinally in succession.

In this respect, it will be noticed that, the present disclosure may particularly apply to a "smooth" nacelle 1 in which the outer downstream panel 13 is mounted stationary, in invariant position, with respect to the cowl 7.

However, the present disclosure will in one form relate to a nacelle 1 in which the outer downstream panel 13 forms an outer panel of thrust reverser, moveably mounted in axial sliding with respect to the cowl 7, and more globally, with respect to the fairing 10 of the engine 11.

Said outer panel of thrust reverser, to which the outer downstream panel 13 may be assimilated in what follows for ease of reference, may in particular be of "O-duct" type, that is to say form an integral quasi-annular shroud which extends on the circumference of the nacelle, from one edge to the other of the fixing mast (or "pylon", not represented), or even of "D-duct" type, that is to say fractioned into a plurality of panels, and in one form in two panels each substantially covering a half-circumference of the nacelle 1.

According to the present disclosure, and as it is in particular visible on FIGS. 3, 4, 5 and 7, the centering device 12 comprises, in one single piece:

a sub plate 14 allowing fixing the centering device 12 to the fan casing 5;

a first positioning arm 15, integrally formed with the sub plate 14, protruding upstream, in such a manner as to form, with respect to the directing axis A of the nacelle 1, a first radial abutment designed for guiding the cowl of the fan casing 7; and a second positioning arm 16, integrally formed with the sub plate 14, protruding downstream, in such a manner as to form, with respect to the directing axis A of the nacelle 1, a second radial abutment designed for guiding the outer downstream panel 13, in order to be able to provide the positioning of said outer downstream panel 13 substantially in the extension flush with the cowl of the fan casing 7, such as it is in particular illustrated on FIGS. 4 and 5.

Advantageously, the centering device 12 allows achieving, by means of one same piece forming a common referential, both a radial centering of the cowl 7 of the fan casing, thanks to the first positioning arm 15, and a radial retaining, of anti-scooping type, of the outer downstream panel 13, thanks to the second positioning arm 16.

Thanks to such an arrangement, the visible radially external, surfaces, of the cowl 7 and downstream panel 13 may advantageously be flush, in the extension of each other, without marking a step or any radial recess.

It will be noted that by "radial", or "radially", reference is being made to one (or several) direction(s) substantially perpendicular to the directing axis A, or, to the distances measured, according to these directions, with respect to said directing axis A.

In one form, the first positioning arm 15 and the second positioning arm 16 form two shoulders substantially transversal to the sub plate 14, and more particularly substantially ortho-radial, capable of supporting the radial forces exerted respectively by the cowl 7 and the downstream panel 13, and necessary to the centering and centered hold of these members.

The cowl of the fan casing 7 may thus axially overlap the first arm 15, the partial covering of these elements, over a section of the directing axis A, providing the sought centering.

Similarly, the outer downstream panel may thus axially overlap the second arm 16, the partial covering of these elements, over a (another) section of the directing axis A, providing the sought centering.

In another form, said first and second arms 15, 16 will originate on the sub plate 14 in the portion located in the half, the third, or the radially most external quarter of the centering device 12, that is to say in the half, third, or even the upper quarter of said centering device on FIGS. 4 to 8.

Thus, the two positioning arms 15, 16 will be radially close, thus contributing in limiting, in particular during the manufacture of the centering device 12, the differences in positioning of the reference surfaces (or carrying surfaces) of these arms, against which the cowl 7, respectively the downstream panel 13, bear.

The second positioning arm 16 (downstream) will be further, in other form, located in a radially re-entrant position with respect to the first arm 15 (upstream), that is to say nearest to the directing axis A.

In longitudinal section, such as is in particular visible on FIGS. 4 and 7, the centering device 12 may thus substantially have the shape of an upturned boot, the sub plate 14 of which will form the rod, the first arm 15 the plate, and the second arm 16 a spur.

As for the sub plate 14, it may extend substantially radially between the fan casing 5 and the cowl of the fan casing 7.

Said sub plate 14 may be fixed to any fixing member 17, 18 secured to the fan casing 5, and in particular to a radial fixing lug 17 and/or flange 18 fixed to said casing 5 or integral with the latter.

In another form of arrangement, the centering device 12 will rest on and be fixed to the fan casing 5 on the one hand by the first arm 15 thereof, which will advantageously radially press, by its radially inner face, and in other form by means of an adjusting wedge 19, against an L shaped flap 20 of the flange 18 of a substantially combined shape, and on the other hand by the sub plate 14 thereof, which will axially press against said flange 18 (FIG. 5) and/or against a fixing lug 17 (FIG. 3).

In a particularly preferential manner, such as is in particular illustrated on FIGS. 4 and 5, the cowl 7 of the fan casing radially bears against a radially external carrying surface 15E of the first positioning arm 15, whereas the outer downstream panel 13 has a retaining hook 21 which radially bears against a radially internal carrying surface 161 of the second positioning arm 16.

In one form, the cowl 7 will hence bear, by its inner face 71, against the centering device 12, counter to the radially external carrying surface 15E of the first arm 15, and hence will tend to exert a substantially centripetal radial force on said first arm 15.

In contrast, the outer downstream panel 13 will tend to exert, via the retaining hook 21, a radial centrifugal force on the second arm 16.

Ultimately, it will thus be obtained a particularly sturdy, stable and compact cross mounting.

In another form, the outer downstream panel 13 is formed by an outer panel of thrust reverser which is moveably mounted according to the directing axis A of the nacelle 1.

In other form, said outer downstream panel 13 may hence be provided with a radially re-entrant retaining hook 21 which has an docking ramp 22 radially slanting in such a manner as to establish a gradual contact with the second positioning arm 16, and more particularly its radially internal carrying surface 161, when said outer downstream panel 13 is brought closer axially to the centering device 12.

Advantageously, such an arrangement will allow obtaining an automatic re-centering, at once gradual, smooth, and particularly precise, each time the thrust reversers will be folded after having been temporarily deployed during certain maneuvers of the aircraft, that is to say, with each return of the outer downstream panel(s) 13 to its (their) rest configuration.

The centering device 12 may hence advantageously fulfill a dynamic centering role, in flight, with regard to the thrust reversers.

Besides, whether said centering device 12 equips a nacelle 1 provided with thrust reversers or a smooth nacelle 1, said centering device 12 will advantageously be able to fulfill the role of static centering device, during the assembling of the nacelle 1, by guiding and stabilizing the outer downstream panel 13 during the placing thereof.

Of course, the centering device 12 will be produced in a sufficiently stiff material in order to impart the first and second positioning arms 15, 16 with a structural carrying stiffness, allowing them to resist in particular to the radial components of the pressing forces exerted on them by the cowl 7 and downstream panel 13, and consequently to fulfill their roles of centering arms, and thus when inoperative, during the assembling, as well as during flight, in particular during re-configurations of the thrust reversers.

Advantageously, said centering device 12 may thus be produced in a light weight metallic material, for example an aluminum alloy.

The centering device may also include reinforcing ribs 23, for example forming cheeks which laterally border the second positioning arm 16 in order to connect it to the edges of the sub plate 14, such as is illustrated on FIG. 3.

In one form, the first positioning arm 15 bearing a receiving surface 24 against which the cowl of the fan casing 7 is intended to radially press, said receiving surface 24 is radially domed towards said cowl 7.

In another form, said receiving surface 24 substantially corresponds to a portion of sphere.

In another form, the receiving surface 24 is located radially towards the outside of the first arm 15, in order to be able to receive and support the inner face 71 of the cowl.

The radius R24 of said receiving surface 24 may hence substantially correspond to the distance from said receiving surface 24 to the directing axis A, and more particularly to the radius of the outer circumference of said receiving surface 24 around said directing axis A.

Advantageously, the domed, and in other form spherical character of the receiving surface 24 against which the cowl 7 directly bears, improves the contact between the cowl of the fan casing 7 and the centering device 12, by allowing in particular the assembling to better accommodate the angular positioning tolerances of said cowl 7 with respect to the fan casing 5 and the centering device 12.

Such a cone/sphere type recess in fact allows a contacting of the cowl 7 (the cone) with the centering device 12 (the sphere) which is not appreciably affected by the orientation of the gauge plane according to which said cowl 7 comes in contact with the receiving surface 24, gauge plane which contains the contact line, of annular type, established between said cowl 7 and said receiving surface 24, and which in principle is substantially normal to the directing axis A.

According to a variant, corresponding for example to that of FIG. 5, the domed receiving surface 24 is produced directly in the matter constituting the first positioning arm 15.

In other words, the receiving surface may be directly fashioned, and for example molded or machined, in the first arm 15, and in one form on the radially external surface 15E of the latter, in such a manner that the cowl 7 may come in direct contact with said first arm 15.

More globally, the nacelle 1 may be designed in such a manner that the cowl of the fan casing 7 comes in direct contact with the first positioning arm 15, that is to say the with the monolithic body of the exposed centering device 12, said first arm 15, and in one form the radially external carrying surface 15E thereof, forming in itself the supporting surface of reference allowing the centering of the cowl 7.

Similarly, and regardless of the rest of the arrangement retained at the first arm 15, the nacelle 1 may be designed in such a manner that the outer downstream panel 13 comes in direct contact with the second positioning arm 16, that is to say with the monolithic body of the exposed centering device 12, said second arm 16, and in another form the radially internal carrying surface 161 thereof, forming in itself the supporting surface, and more particularly the radial retaining surface, allowing the centering of said downstream panel 13, optionally via the hook 22 embedded the latter.

Advantageously, the members to be centered, namely the cowl 7 and the downstream panel 13, may thus radially respectively bear on a same solid of reference, which minimizes and thereby optimizes the chain of dimensions between said bearings.

According to another variant, corresponding for example to that of FIGS. 4 and 7, the domed receiving surface 24 is formed by an engagement wedge 25 added and fixed on a carrying surface, here the radially external surface 15E, of the first positioning arm 15, in such a manner as to be radially interposed between said carrying surface 15E of the first arm and the corresponding face, here the radially inner face 71, of the cowl of the fan casing 7.

Such an engagement wedge 25 will advantageously be radially sandwiched, thickness-wise, on one side directly by the plateau (carrying surface 15E) provided by the first arm 15, and on the other side directly by the inner face 71 of the cowl 7 which is located radially facing said first arm 15, in an axially overlapping manner to the latter.

Said wedge 25 may for example be screwed on the radially external carrying surface 15E of the first arm 15, optionally on the same screws as those allowing the fixing of said first arm 15 on the flap 20 of the flange 18.

Said engagement wedge 25 may further form a sliding interface, of anti-friction lining type, allowing to reduce the friction resistance of the cowl 7 on the centering device 12 during the placing of said cowl 7.

More globally, and whatever the arrangement thereof, the first arm 15 may include an anti-friction lining 25, 26 intended to facilitate the sliding of the cowl of the fan casing 7 on the receiving surface 24 of said first arm 15, said lining being produced in a low friction coefficient material, for example polymer such as Polytetrafluoroethylene ("PTFE").

Said lining material may take the form of a coating 26, if the receiving surface is fashioned directly in the first arm 15, or even in an engagement wedge 25, such as has been explained above.

Advantageously, the presence of such a lining facilitates the sliding of the cowl 7 on the centering device 12, by preventing any seizing during assembling.

According to another variant, the materials constituting the cowl 7 on the one hand, and the centering device 12 on the other hand may be selected in such a manner as to present, relative to each other, a low friction coefficient.

For example, the cowl 7 may be produced of carbon fibers and the centering device 12 of another material, for example aluminum alloy.

Obviously, similar fittings may be considered, with engagement wedge and/or non-stick coating at the contact interface between the second positioning arm 16 and the outer downstream panel 13, and more particularly the docking ramp 22 of the retaining hook 21.

Particularly, said docking ramp 22 may be produced in polymer, or coated with such a material.

The present disclosure further relates to in its current form a nacelle 1 for turbojet engine which includes at least a centering device 12 according to the present disclosure, and in one form a plurality of centering devices 12 according to the present disclosure distributed around the directing axis A thereof, such as is illustrated on FIG. 1.

The number of centering devices 12 and the distribution thereof, possibly regular, over the circumference of the nacelle 1, may of course depend on the dimensions of said nacelle, as well as the radial, in particular pressure or vacuum forces, which should be supported by the cowl of the fan casing 7, the outer downstream panel 13, and as a result said centering devices 12.

According to one form of the present disclosure, whatever the assembly configuration of the cowl 7 on the centering device 12 is, the first positioning arm 15 will carry a fire protection seal 27 which comes in contact with the corresponding surface, here the radially inner face 71, of the cowl of the fan casing 7, in such a manner as to provide fire integrity of the compartment 28 which should receive the fan 6.

As is illustrated on FIG. 5, said fire protection seal 27 may be of the annular seal with lip type.

Said seal 27 may advantageously be pressed and tightened radially between the first arm 15 and the flap 20 of the flange 18.

The present disclosure in its current form finally relates to a propulsion assembly for aircraft which includes a nacelle 1 which acts as a fairing for a turbojet engine according to the present disclosure, or even an aircraft equipped with one or several propulsion assemblies in accordance with the present disclosure.

Obviously, the present disclosure will in no way be limited to the aforementioned variants, the one skilled in the art being in particular capable of isolating or freely combining one and/or the other of the features described above.

What is claimed is:

1. An apparatus comprising:
    a centering device, configured to integrate a turbojet engine nacelle which comprises at least one cowl of a fan casing, the at least one cowl having an inner face, and at least one outer downstream panel, of a thrust reverser outer panel, which is placed longitudinally in succession, said centering device comprising, in one single piece:
        a sub plate fixing said centering device to the fan casing;
        a first positioning arm, integrally formed with the sub plate, protruding upstream, so as to form, with respect to a directing axis (A) of the turbojet engine nacelle, a first radial abutment for guiding the cowl of the fan casing, the first positioning arm defining a receiving surface that abuts the inner face of the cowl; and
        a second positioning arm, integrally formed with the sub plate, protruding downstream, so as to form, with respect to the directing axis (A) of the turbojet engine nacelle, a second radial abutment for guiding the outer downstream panel, in order to provide positioning of the outer downstream panel substantially in an extension flush with the cowl of the fan casing, the second positioning arm defining a radially internal carrying surface; and
        a retaining hook secured to the downstream panel that radially bears against the radially internal carrying surface of the second positioning arm,
    wherein the cowl exerts a centripetal radial force on the first positioning arm, and the retaining hook exerts a radial centrifugal force on the second positioning arm.

2. The centering device according to claim 1 wherein the cowl of the fan casing radially presses against the receiving surface of the first positioning arm, and the receiving surface is radially domed towards the cowl.

3. The centering device according to claim 2, wherein the receiving surface substantially corresponds to a portion of sphere.

4. The centering device according to claim 2, wherein the receiving surface is within the first positioning arm.

5. The centering device according to claim 2, wherein the receiving surface is formed by an engagement wedge added and fixed on a radially external carrying surface, of the first positioning arm, being radially interposed between the radially external carrying surface of the first positioning arm and the inner face, of the cowl of the fan casing.

6. The centering device according to claim 2, wherein the first positioning arm comprises an anti-friction lining to facilitate a sliding of the cowl of the fan casing on the receiving surface of the first positioning arm, the anti-friction lining being produced in a low friction coefficient material.

7. The centering device according to claim 6, wherein the anti-friction lining is made of Polytetrafluoroethylene (PTFE), which forms a coating or an engagement wedge.

8. A nacelle for turbojet engine comprising at least one centering device according to claim 1.

9. The nacelle according to claim 8, wherein a plurality of centering devices are distributed around the directing axis (A) thereof.

10. The nacelle according to claim 8, wherein the cowl of the fan casing radially bears against a radially external carrying surface of the first positioning arm, and the outer downstream panel comprises the retaining hook which radially bears against the radially internal carrying surface of the second positioning arm.

11. The nacelle according to claim 8, wherein the outer downstream panel is formed by the thrust reverser outer panel which is moveably mounted according to the directing axis (A) of the nacelle, and the outer downstream panel is provided with the retaining hook which comprises a docking ramp radially slanting so as to establish a gradual contact with the second positioning arm, when the outer downstream panel is brought closer axially to the centering device.

12. The nacelle according to claim 8, wherein the first positioning arm carries a fire protection seal which comes in contact with a corresponding surface of the cowl of the fan casing, so as to provide fire integrity of a compartment which receives a fan.

13. A propulsion assembly for an aircraft, the propulsion assembly comprises the nacelle according to claim 8, which acts as a fairing for the turbojet engine.

\* \* \* \* \*